United States Patent [19]

Hou et al.

[11] Patent Number: 4,687,820

[45] Date of Patent: Aug. 18, 1987

[54] MODIFIED POLYPEPTIDE SUPPORTS

[75] Inventors: Kenneth C. Hou, S. Glastonbury; Tung-Ping D. Liao, Vernon, both of Conn.

[73] Assignee: Cuno Incorporated, Meriden, Conn.

[21] Appl. No.: 857,513

[22] Filed: Apr. 22, 1986

Related U.S. Application Data

[63] Continuation of Ser. No. 643,212, Aug. 22, 1984, abandoned, which is a continuation-in-part of Ser. No. 576,448, Feb. 2, 1984, which is a continuation-in-part of Ser. No. 466,114, Feb. 14, 1983, abandoned.

[51] Int. Cl.$^4$ .................... D06M 3/02; D06M 13/20; C08L 89/00
[52] U.S. Cl. .................. 525/54.1; 210/656; 530/417; 8/128 A
[58] Field of Search ............ 525/54.1, 54.11; 526/238.1; 527/101, 102; 524/35, 492; 8/128 R, 128 A; 210/656, 660, 767, 927; 530/417

[56] References Cited

U.S. PATENT DOCUMENTS

| | | | |
|---|---|---|---|
| 3,251,475 | 5/1966 | Till et al. | 210/508 |
| 3,338,883 | 8/1967 | Tesoro et al. | 536/30 |
| 3,359,222 | 12/1967 | Faessinger et al. | 527/102 |
| 3,495,930 | 2/1970 | Machell | 8/127.6 |
| 3,529,924 | 9/1970 | Maloney | 525/54.1 |
| 3,583,855 | 6/1971 | Bolinger et al. | 8/128 |
| 3,651,210 | 3/1972 | Shepler et al. | 525/54.1 |
| 3,700,609 | 10/1972 | Treager et al. | 521/53 |
| 3,764,477 | 10/1973 | Lehmann et al. | 435/180 |
| 3,959,079 | 5/1976 | Mareschi et al. | 210/24 |
| 3,985,616 | 10/1976 | Weaver et al. | 195/63 |
| 4,007,113 | 2/1977 | Ostreicher et al. | 210/504 |
| 4,007,114 | 2/1977 | Ostreicher et al. | 210/504 |
| 4,007,143 | 2/1977 | Garnett et al. | 527/102 |
| 4,011,377 | 3/1977 | Dean et al. | 526/13 |
| 4,029,583 | 6/1977 | Chang et al. | 210/198 C |
| 4,038,140 | 8/1977 | Jaworek et al. | 195/63 |
| 4,070,348 | 1/1978 | Kräemer et al. | 526/260 |
| 4,089,840 | 5/1978 | Blount | 260/448.2 R |
| 4,102,746 | 7/1978 | Goldberg | 195/63 |
| 4,140,653 | 2/1979 | Imura et al. | 252/430 |
| 4,144,190 | 3/1979 | Bowes et al. | 252/427 |
| 4,264,766 | 4/1981 | Fischer | 536/51 |
| 4,281,233 | 7/1981 | Coupek et al. | 210/198.2 |
| 4,305,782 | 12/1981 | Ostreicher et al. | 210/505 |
| 4,309,247 | 1/1982 | Hou et al. | 210/505 |
| 4,332,694 | 6/1982 | Kálal et al. | 252/189 |
| 4,344,775 | 8/1982 | Klein | 55/75 |
| 4,347,320 | 8/1982 | Borglum | 435/144 |
| 4,352,884 | 10/1982 | Nakashima et al. | 435/180 |
| 4,384,957 | 5/1983 | Crowder et al. | 210/656 |
| 4,412,000 | 10/1983 | Lehmann et al. | 435/179 |
| 4,449,978 | 5/1984 | Iacoviello | 604/372 |
| 4,488,969 | 12/1984 | Hou | 210/927 |

FOREIGN PATENT DOCUMENTS

| | | |
|---|---|---|
| 12273816 | 6/1975 | France . |
| 11157300 | 5/1966 | United Kingdom . |

Primary Examiner—John Kight
Assistant Examiner—Nathan M. Nutter
Attorney, Agent, or Firm—Michael E. Zall; Samuel L. Fox; Jorge A. Goldstein

[57] ABSTRACT

A modified polypeptide material comprising an insoluble polypeptide carrier and synthetic polymer, the synthetic polymer made from (a) a polymerizable compound which has a chemical group capable of covalent coupling to the insoluble polypeptide carrier and (b) one or more polymerizable compounds containing an ionizable chemical group, a chemical group capable of transformation to an ionizable chemical group, a group capable of causing the covalent coupling of the synthetic polymer to an affinity ligand or a biologically active molecule, or a hydrophobic chemical group. The synthetic polymer is covalently bonded to the insoluble polypeptide carrier.

5 Claims, 6 Drawing Figures

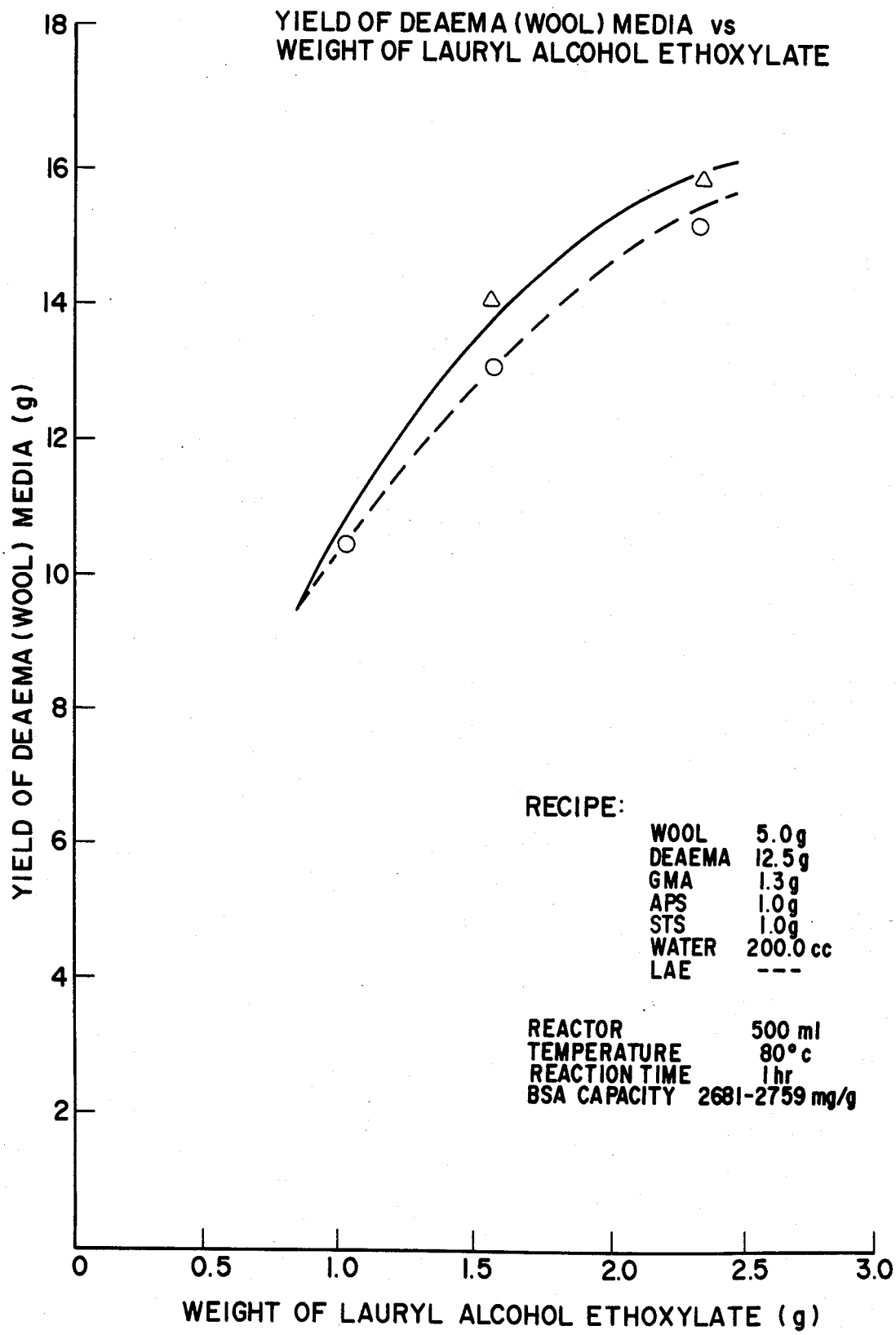

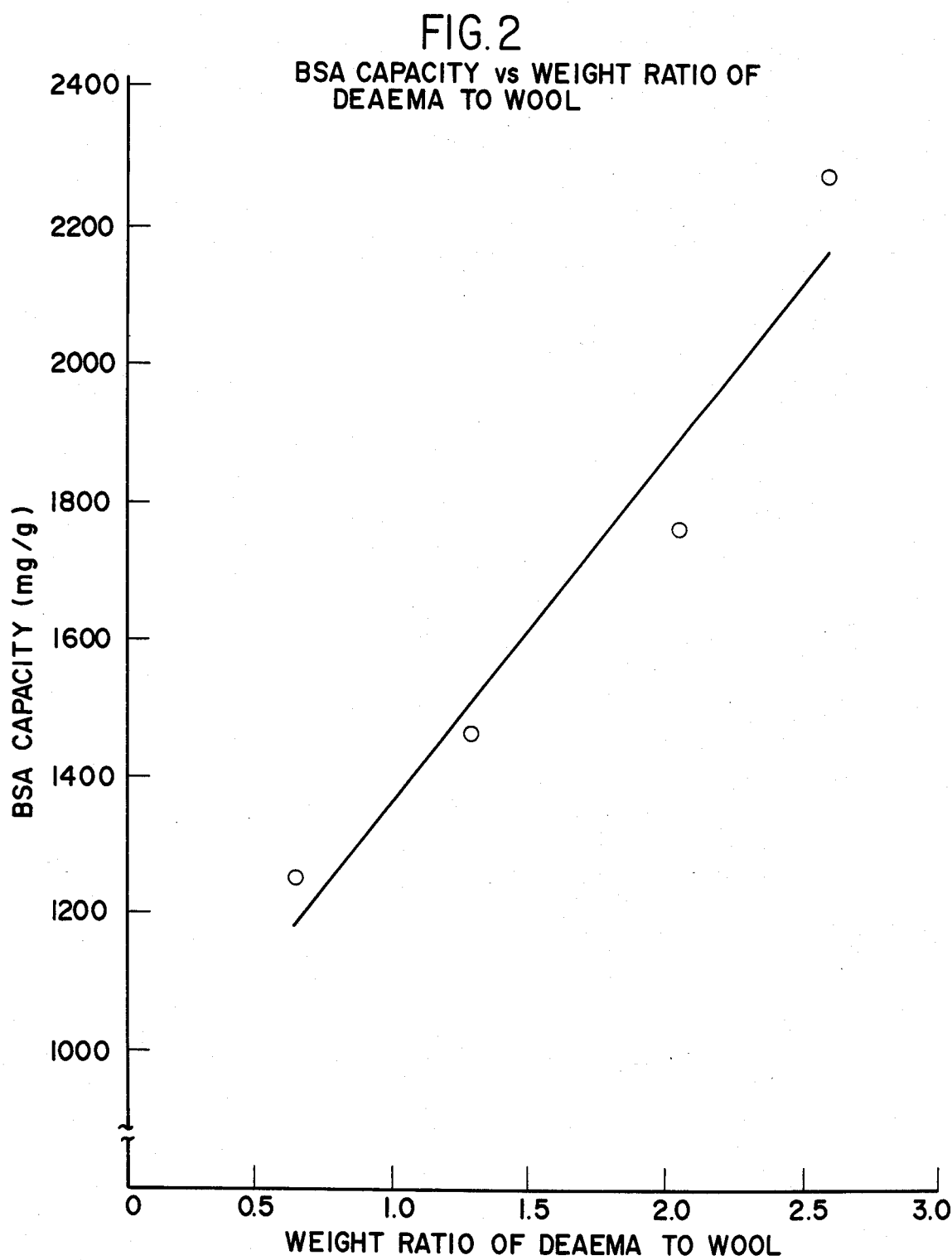

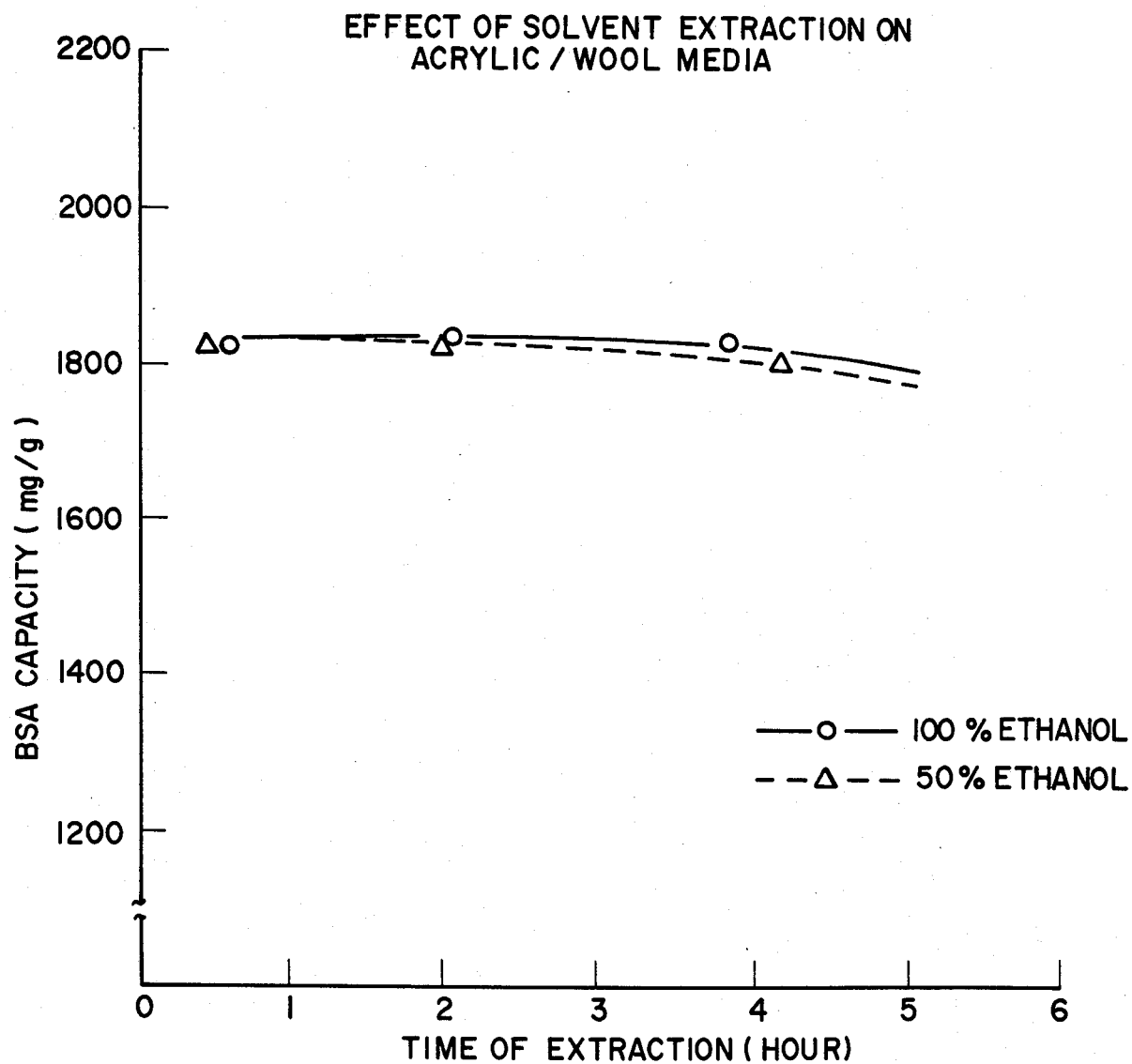

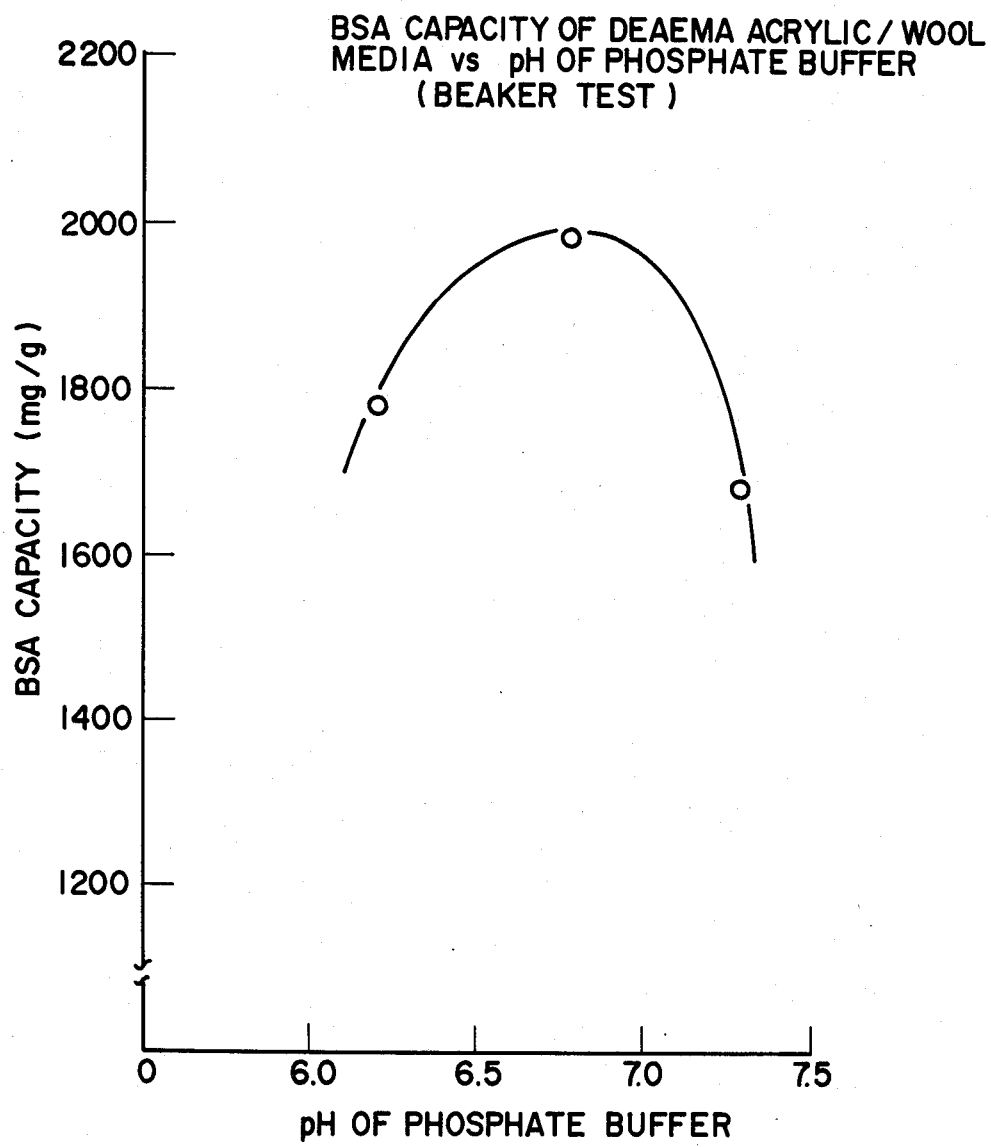

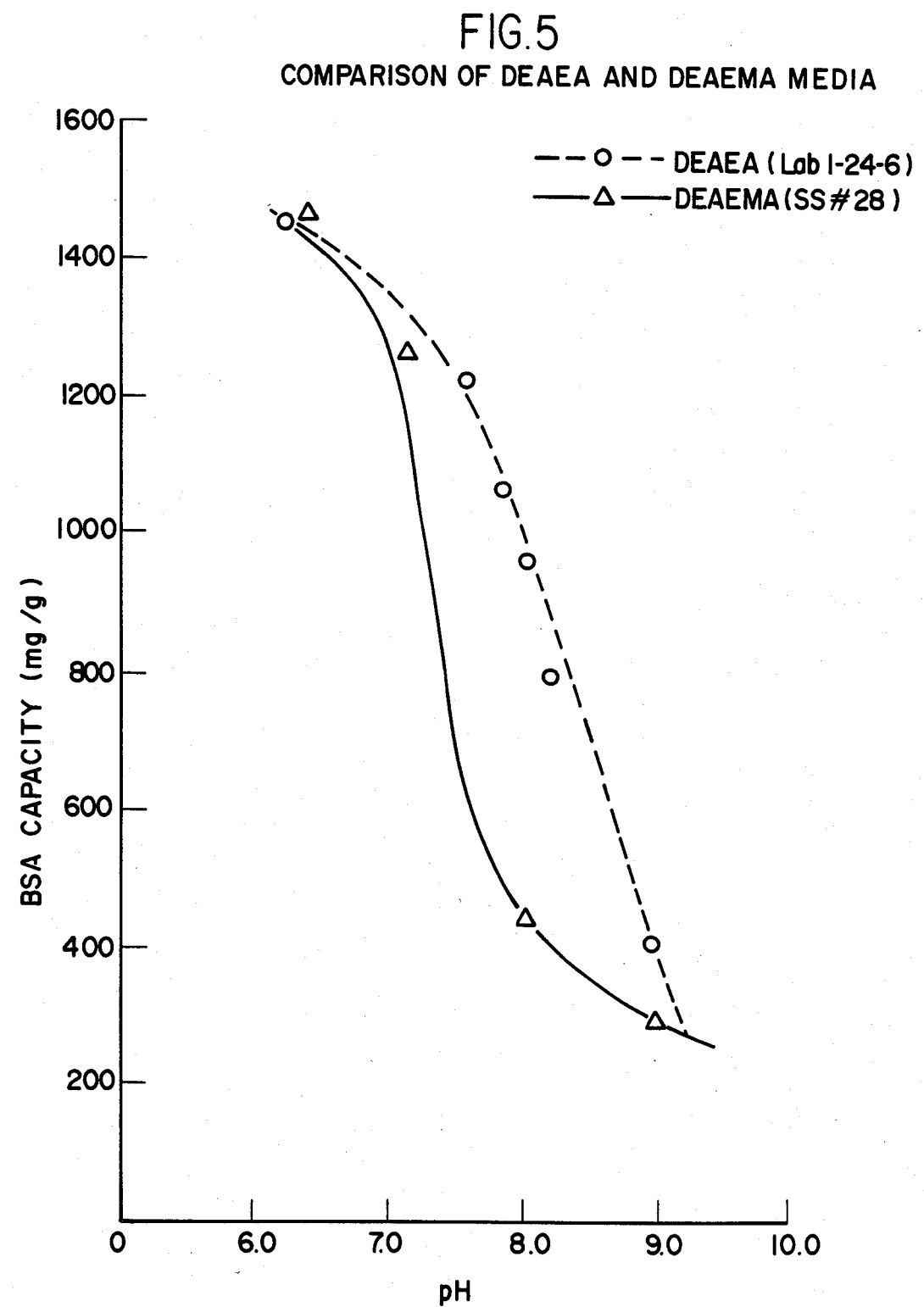

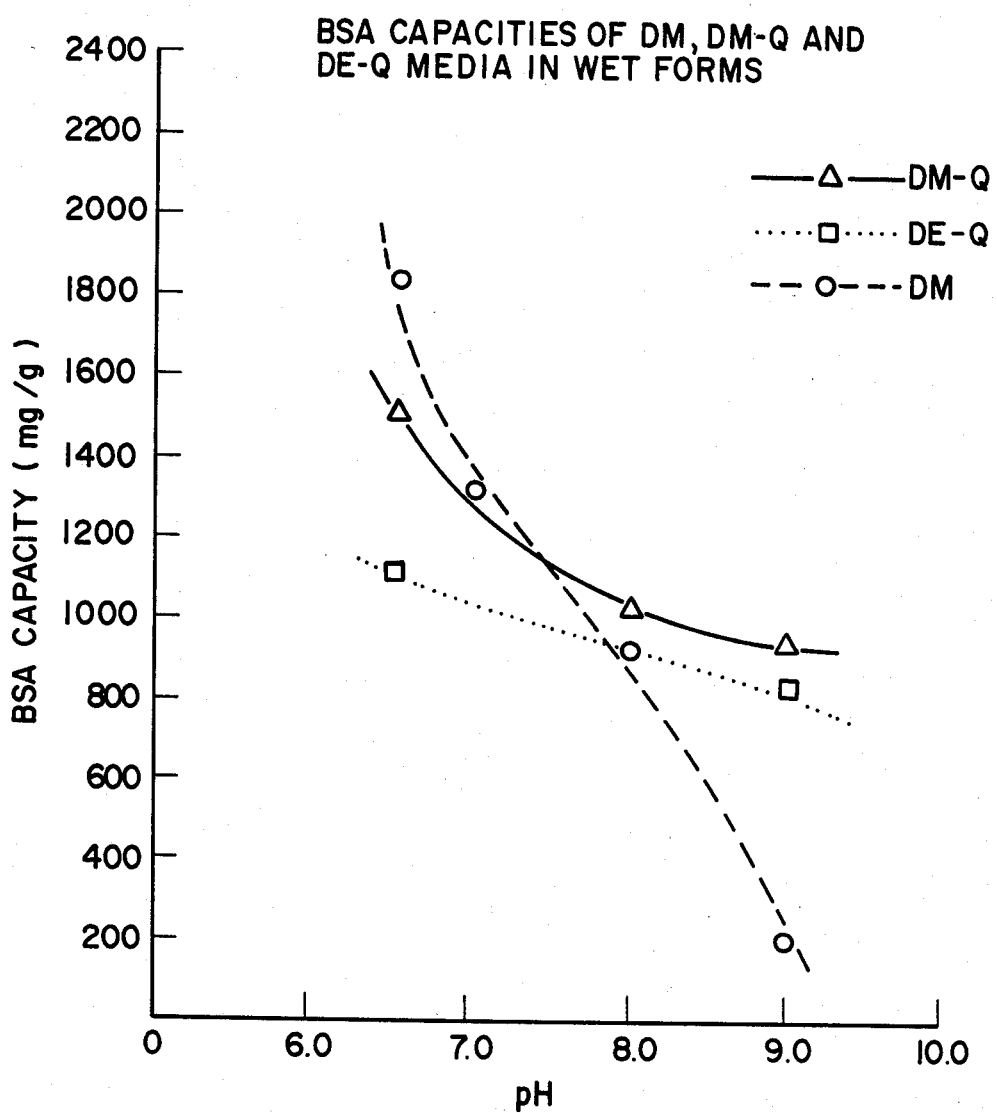

MODIFIED POLYPEPTIDE SUPPORTS

CROSS REFERENCE TO RELATED APPLICATIONS

This application is a continuation of application Ser. No. 643,212, filed Aug. 22, 1984, now abandoned, which is a continuation-in-part of pending application Ser. No. 576,448, filed Feb. 2, 1984 and now allowed, which is a continuation-in-part of application Ser. No. 466,114, filed Feb. 14, 1983 and now abandoned.

This application is also related to application Ser. No. 643,613, filed on the same day as this application by the same inventors.

BACKGROUND OF THE INVENTION

1. Field of the Invention

The present invention is directed to carrier supports such as chromatographic supports and methods for their preparation and use. More specifically, this invention relates to the grafting of acrylic polymers and copolymers onto a polypeptide substrate.

2. Brief Description of the Background Art

The broad applicability of ion exchange chromatography, which ranges from separation of inorganic and organic ions to that of protein molecules and other biomolecules, has made it a powerful and versatile tool for chemical and biochemical separations. The technique was originally limited to the use of natural products such as cellulose, clay and other minerals containing mobile ions that would exchange with ionic materials in the surrounding solute phase. Because of the low exchange capacity of these natural products, however, practical utilization thereof was limited, and synthetic organic polymers capable of exchanging ions were developed.

Among the first generation of synthetic ion exchange materials were the ion exchange resins. The fundamental framework of these ion exchange resins is an elastic three-dimensional hydrocarbon network comprising ionizable groups, either cationic or anionic, chemically bonded to the backbone of a hydrocarbon framework. The network is normally fixed, insoluble in common solvents and is chemically inert. The ionizable functional groups attached to the matrix carry active ions which can react with or can be replaced by ions in the solute phase. Therefore, the ions in the solute phase can be easily exhcanged for the ions initially bound to the polymeric resins. Typical examples of commercially available ion exchange resins are the polystyrenes crosslinked with DVB (divinylbenzene), and the methacrylates copolymerized with DVB. In the case of polystyrene, a three-dimensional network is formed first, and the functional groups are then introduced into benzene rings through chloromethylation. Since ion exchange resins are elastic three-dimensional polymers, they have no definite pore size; only a steadily increasing resistance of the polymer network limits the uptake of ions and molecules of increasing size.

The resistance to flow exhibited by these resins is controlled by the degree of crosslinking. With a low degree of crosslinking, the hydrocarbon network is more easily stretched, the swelling is large, and the resin exchanges small ions rapidly and even permits relatively large ions to undergo reaction. Conversely, as the crosslinking is increased, the hydrocarbon matrix is less resilient, the pores of the resin network are narrowed, the exchange process is slower, and the exchanger increases its tendency to exclude large ions from entering the structure. The ion exchange resins made from polymeric resins have been successfully applied for the removal of both organic and inorganic ions from aqueous media but they are normally unsuitable for the separation of biopolymers such as proteins. This is due, among others, to the following reasons:

(1) The highly crosslinked structure of the resins has rather narrow pores to accommodate the diffusion of proteins; the proteins therefore are virtually restricted to the macrosurface area of the beads with consequent limitation of solute loadings;

(2) The high charge density close to the proximity of the resin surface is unsuitable, since it causes excessive binding and distortion of protein structure;

(3) The hydrocarbon matrix is usually hydrophobic and is potentially dangerous to the subtle three-dimensional structure of biopolymers, often causing denaturation of proteins.

The next generation of chromatographic materials useful for separation of proteins and other labile biological substances was based on cellulose ion exchangers. These lacked nonspecific adsorption and had practicable pore structure. Such prior art ion exchange celluloses are made by attaching substituent groups with either basic or acidic properties to the cellulose molecule by esterification, etherification, or oxidation reactions. Examples of cationic exchange celluloses are carboxymethylated cellulose (CM), succinic half esters of cellulose, sulfoethylated cellulose, and phosphorylated cellulose. Examples of anionic exchange celluloses are diethylaminoethyl cellulose (DEAE), and triethylaminoethyl cellulose (TEAE). Ion exchange materials based on cellulose as the principal backbone or anchoring polymer, however, have not enjoyed complete success due primarily to an inherent property of cellulose: its affinity for water. Thus, prior art ion exchange materials based on cellulose, while typically having high exchange capacity, are difficult to use as a consequence of their tendency to swell, gelatinize or disperse on contact with an aqueous solution. An ideal ion exchange material should minimally interact with the solvent system which carries the ions in solution through its pores; only in this manner is it possible to obtain a rapid, free flowing ion exchange system.

A third generation of ion exchange materials, which were developed to solve some of these problems, were the ion exchange gels. There gels comprise large pore gel structures and include the commercially known material Sephadex ®, which is a modified dextran. The dextran chains are crosslinked to give a three-dimensional polymeric network. The functional groups are attached by ether linkages to the glucose units of the dextran chains. Proteins are not denatured by the hydrophilic polymeric network. Sephadex ® exhibits very low nonspecific absorption, which makes it ideal as a matrix for biological separations. However, the porosity of ion exchange gels is critically dependent on its swelling properties, which in turn is affected by the environmental ionic strength, pH and the nature of the counter-ions. Swelling of gels in buffer is caused primarily by the tendency of the functional groups to become hydrated. The amount of swelling is directly proportional to the number of hydrophilic functional groups attached to the gel matrix, and is inversely proportional to the degree of crosslinking present in the gel. This characteristic swelling is a reversible process, and at equilibrium there is a balance between two forces: (1) the tendency of the gel to undergo further hydration, and hence to increase the osmotic pressure within the gel beads, and (2) the elastic forces of the gel matrix. The osmotic pressure is attributed almost entirely to the hydration of the functional groups, and, since different ions have different degrees of hydration, the particular counter ions in an ion exchange gel can be expected to have a considerable influence upon the degree of swelling. Since the pH, the electrolyte concentration and the nature of the counter-ion can all affect the hydration, leading to a different degree of gel swelling, the pore size in the gels is not in well defined form but is rather dependent on the environmental conditions. Gels without crosslinking provide large pores and high capacity due to maximum swelling. They suffer, however, from the weakness of structural integrity and can easily be crushed with a minimum amount of pressure. Removal of the solvent from the gels often results in collapse of the matrix. Highly crosslinked gels have mechanical strength, but lose capacity and pore size due to restrictions in swelling.

Ion exchange gels made from synthetic polymers have also been used, and they include crosslinked polyacrylamide (Bio-Gel P ®), microreticular forms of polystyrene (Styragel ®), poly(vinyl acetate) (Merck-o-Gel OR ®), crosslinked poly(2-hydroxy ethylmethacrylate) (Spheron ®), and polyacryloylmorpholine (Enzacryl ®). All of these follow the general trend: it may be possible to obtain dimensional stability with high flow rate or, alternatively, high capacity with swelling. It is, however, not possible to obtain both capacity and high flow rate at the same time.

The failure of single components to have both capacity and dimensional stability led to yet another generation of ion exchange materials comprising composite structures, e.g., hybrid gels. Hybrid gels are made by combining a semi-rigid component, for the purpose of conferring mechanical stability, with a second component, a softer network, which is responsible for carrying functional groups. Agarose gel, which would otherwise be very soft and compressible, can be made stronger through hybridizing with cross-linked polyacrylamide. The crosslinked polyacrylamide component is mechanically stronger than the agarose, improves the gel flow properties, and reduces the gel swelling, but it sacrifices molecular fractionation range. Examples of hybrid gels other than polyacrylamide/agarose (Ultrogels ®), are polyacryloylmorpholine and agarose (Enzacryl ®), and composite polystyrenes with large pore polystyrenes as a framework filled with a second type of lightly cross-linked polymer.

Yet another composite gel structure is achieved by combining inorganic materials coated with organics, and are the types known as Spherosil ®. Porous silica beads are impregnated with DEAE dextran so that the product will have the mechanical properties of silica, with the ion exchange properties of DEAE dextrans. These composites, however, have severe channeling defects arising out of particle packing, and they have capacity limitations on the coated surfaces.

Totally rigid inorganic supports such as porous silica or porous glass which are not susceptible to degradation have also been used to provide high porosity, and high flow rate systems. The major problem, however, is nonspecific adsorption of proteins due to the silanol groups on the silica surface. Since the hydrolysis of silica is directly related to the pH conditions, the nonspecific adsorption of silica is minimal at neutral pH, but increases as the pH changes both to the acidic or alkaline ranges. A monolayer coating by either hydrophilic organic polymers or silanization has been used in an attempt to overcome this problem.

In the technique of affinity chromatography, which enables the efficient isolation of biological macromolecules or biopolymers, by utilizing their recognition sites for certain supported chemical structures with a high degree of selectivity, the prior art has also utilized materials of varying chemical structure as supports. For example, agarose gels and crosslinked agarose gels have been the most widely used support materials. Their hydrophilicity makes them relatively free of nonspecific binding, but their compressibility make them less attractive as carriers in large scale processing, such as in manufacturing. Controlled-pore glass (CPG) beads have also been used in affinity chromatography. Although high throughputs can be obtained with columns packed with CPG, this carrier is even more expensive than agarouse gel beads. Cellulose particles have also been used by immunochemists for synthetic affinity sorbents. However, compared to agarose gels, cellulose particles are formed with more difficulty and therefore, have received less attention in the preparation of affinity sorbents for enzymes. Cellulose, however, is perhaps the least expensive of all support matrices. Two lesser used support matrices are polyacrylamide gel beads and Sephadex ® gel beads made from dextran and epichlorohydrin. Although convenient methods have been developed for using them, the softness of these beads yields poor column packings, and their low molecular porosity yields a sorbent with poor ligand availability to the ligate.

Coupek et al., U.S. Pat. No. 4,281,233 show supports for affinity chromatography which comprise copolymers of hydroxy alkyl acrylates or methacrylates with crosslinking monomers. The copoylmers contain convalently attached mono- or oligosaccharides. (An oligosaccharide is defined in the art as having up to nine saccharide units. See, e.g., Roberts, J. D., and Caserio, M. C., *Basic Principles of Organic Chemistry*, 1964, p. 615.)

A carrier for bio-active materials is also disclosed in Nakashima et al., U.S. Pat. No. 4,352,884. The Nakashima carrier comprises a substrate coated with a copolymer. The substrate may be one of various materials, including inorganic materials such as glass, silica, alumina, synthetic high polymers such as polystyrene, polyethylene and the like, and naturally occurring high polymers such as cellulose. The copolymer is made of a hydrophilic acrylate or methacrylate monomer which is a hydroxy or alkoxy alkyl acrylate or methacrylate, and a copolymerizable unsaturated carboxylic acid or amine. The base material or substrate is coated with the copolymer by conventional coating or deposition procedures, such as spraying, dipping, phase separation or the like. The copolymer may also contain small amounts of a cross-linking agent such as glycidyl acrylate or methacrylate. The crosslinking agent allows for cross-linking treatment after the coating process, and provides for the prevention of elution (presumably of the bioactive materials) from the coating layer. The amounts of cross-linking agent are quite small, and range between 0.5 and 1 percent by weight of the total copolymer weight. Such amounts of cross-linking agent are insufficient to cause substantial covalent bonding or grafting of the copolymer onto the underlying substrate. The copolymer in Nakashima is thus essentially only physically coating the underlying substrate. Physical coating, however, is accompanied by a series of problems. The carrier would not be expected to have an even distribution of the copolymer, would show a multilayered structure, and may have a possible uneven distribution of functional groups.

Another reference of interest is Kraemer, U.S. Pat. No. 4,070,348, which shows copolymers of glycidyl- and amino-containing acrylates, useful as carriers for biologically active substances, such as polysaccharides, enzymes, peptides, hormones, etc. The structure of the final product in Kraemer is that of an acrylic copolymer chain covalently modified at a multiplicity of sites thereon with substances such as enzymes, other proteins, and the like.

This review of the prior art, its advantages and drawbacks, leads to the conclusion that there exists a need for a support useful both for ion exchange and affinity chromatography-based purification which will have high stability, high porosity, low nonspecific adsorption, high flow rate, low compressibility, controlled gelation, and which will be useful for industrial-scale biological separations. It is at the industrial level of manufacturing, especially, where the aforementioned drawbacks have had their most important effect and where this need is the strongest.

Industrial scale molecular separation materials comprising fibrous matrices with particulate immobilized therein have been described in commonly assigned U.S. Pat. No. 4,384,957 by Crowder, which is herein incorporated by reference. This patent describes a composite fiber material formed by wet layering a sheet from an aqueous slurry of particulate, small refined fiber pulp and long soft fiber pulp. The purpose of the soft long fiber is physically to hold clumps of particulate material and refined pulp together. Sheets are formed from a wet slurry by vacuum filtration, wherein the long fibers form in a plane which is perpendicular to the direction of flow of the chromatographic carrier fluid. This permits channels to form in the composite material which are perpendicular to the direction of flow of the chromatographic carrier fluid and allows these materials to serve as internal flow distributors. The resulting matrix structure has proven to be an effective way of eliminating channeling defects through internal flow distribution mechanisms.

Using a fibrous/particulate matrix with addition of cationic polymers to the slurry and crosslinking the polymers to the matrices by oven drying has yielded a filtration matrix with a positive charge coated on the surface thereof. Such charged matrices can be used for filtering minute amounts of impurities from large volumes of liquid by adsorption. (See, for example Ostreicher, U.S. Pat. Nos. 4,007,113 and 4,007,114, as well as U.S. Pat. Nos. 4,305,782 and 4,309,247, which are all herein incorporated by reference.)

It is inevitable in prior art wet slurrying processes with slurries comprising cationic materials, to obtain materials having uneven distribution of charges, wherein multilayer coating may occur in one spot, whereas other spots on the surface may be bare. Such products are acceptable in filtration processes due to the fact that the amount of impurities needed to be removed is relatively small compared to the bulk liquid volume, and that uneven charge distributions can be compensated by the depth of the filters. However, such products cannot readily be applied to delicate ion exchange processes. The number of active sites, as well as the accessibility of the active sites, is critical to the capacity of such process. The chemical functional groups in ion exchangers cannot be buried close to the surface, but have to be somewhat removed from the surface, possibly with a molecular side arm for accessibility. One way of achieving this has been through the incorporation into the fibrous matrix of silanes which are chemically modified. Such silanes may carry functional groups such as DEAE, CM or affinity chromatography sites. They are mechanically stable and strong and do not swell. However, they are expensive, and show very high nonspecific adsorption of protein by the silica hydroxy groups.

Machell, U.S. Pat. No. 3,495,930, is directed to a method for modifying textile fibers, the modifying monomers containing both acid and basic materials. The acid monomer also contains a sulphonic acid group, the basic monomers including compounds such as N,N-dimethylaminoethyl methacrylate. While the reference discloses that monomers may be reacted with themselves and the fibers, no mechanism of reaction is explained or hypothesized. Particularly, the reference contains no disclosure of compounds which would contain functional groups reactive with the amino acid linkage of a polypeptide.

Shepler et al., U.S. Pat. No. 3,651,210, discloses synthetic emulsion graft copolymers further reacted with a protein. The synthetic emulsion copolymer includes an ester of alpha, beta-unsaturated carboxylic acid containing an oxirane ring and an alpha, beta-unsaturated mono- or dicarboxylic acid or salt thereof. The copolymer contains additionally a water soluble protein and is described as an excellent coating material for leather, a polyprotein. However, the reference contains no suggestion that the synthetic emulsion-protein copolymer is covalently bonded to the leather, a polyprotein.

Dean et al., U.S. Pat. No. 4,011,377, discloses a reactive matrix comprising a co-enzyme which is chemically attached to a water-insoluble polymeric support material. The material is to be used for the separation of mixtures containing a plurality of enzymes. Included among the water-insoluble polymeric support materials are proteins such as wool. This patent contains no disclosure directed to a copolymer comprising both a monomer containg a functional group capable of covalently bonding to a polypeptide substrate and a monomer containing a functional group capable of reacting with a biologically active group.

In sum, neither the ion exchange nor affinity chromatography supports commonly used in laboratory scale purifications, nor the particulate (or ion exchange modified particulate) containing fibrous matrices for chromatography or filtration have proven to be of great use in scale-up of delicate purification processes.

Copending application Ser. No. 576,448, filed Feb. 2, 1984, a continuation-in-part of application Ser. No. 466,114, filed Feb. 14, 1983, is directed to the grafting of acrylic polymer onto a polysaccharide support. The acrylic polymer, a homo- or copolymer, is covalently bonded to the polysaccharide material, the polymer being made from a polymerizable compound which is capable of being covalently coupled directly or indirectly to the polysaccharide, and one or more polymerizable compounds containing a group capable of retaining a bioactive molecule. Covalent bonding with the polysaccharide is effected through the hydroxy groups of the polysaccharide. Typical hydroxy reactive comonomers described by the above-cited copending application include activated carboxy groups, O-alkylating comonomers such as acrylic and methacrylic anhydrides, acrylolylmethacrylolyl N-hydroxy succinimides, and omega-iodo-alkyl esters of acrylic or methacrylic acid, as well as compounds having a glycidyl group such as glycidyl acrylate and methacrylate, 4,5-epoxy-pentylacrylate, and the like.

A further requirement of the synthetic polymer covalently bonded to the polysaccharide substrate is that it contain functional groups capable of retaining bioactive molecules. Typically, these functional groups include an ionizable chemical group, a chemical group capable of transformation to an ionizable chemical group, a chemical group capable of causing the covalent coupling of said polymerizable compound to an affinity ligand or to a biological reactive molecule, or a hydrophobic chemical group.

The present invention is directed to other supports useful in industrial scale ion exchange, reverse phase, and affinity chromatography purification processes, which will be noncompressible, controllably swellable, have high exchange capacity, exhibit high flow rates, be versatile and relatively inexpensive to produce, and demonstrate a high degree of flexibility while still retaining their pre-stretched strength.

SUMMARY OF THE INVENTION

This invention comprises a novel molecular support useful for ion exchange chromatography, affinity chromatography or reverse phase chromatography. The novel molecular support provides chromatographic support useful for industrial scale chromatographic operations, industrial processes of ion exchange, affinity chromatography, and reverse phase chromatography. This invention further comprises processes for the preparation of ion exchange, affinity and reverse phase chromatographic supports.

More specifically, the invention comprises a modified polypeptide material, the modified polypeptide comprising an insoluble polypeptide covalently bonded to a synthetic polymer, said synthetic polymer made from (a) a polymerizable compound which has a chemical group capable of being covalently coupled directly or indirectly to said polypeptide; and (b) one or more polymerizable compounds containing (i) an ionizable chemical group, (ii) a chemical group capable of transformation to an ionizable chemical group, (iii) a chemical group capable of causing the covalent coupling of said polymerizable compound (b) to an affinity ligand or to a biologically active molecule, or (iv) a hydrophobic chemical group. The invention also comprises a process for preparing the modified polypeptide, the process comprising polymerizing the monomers and then grafting the polymerized monomers to the polypeptide. Molecular separation materials derived from the aforementioned polypeptide materials are capable of acting as chromatographic supports for ion exchange chromatography, for affinity chromatography, reverse phase chromatography or as reagents for biochemical reactors.

BRIEF DESCRIPTION OF THE DRAWINGS

The present invention will become better understood by reference to the detailed description provided hereinafter when considered together with the accompanying drawings, wherein FIG. 1 is a graph showing the relationship between the yield of modified wool and weight of lauryl alcohol ethoxylate surface active agent.

FIG. 2 is a graph relating the bovine serum albumin (BSA) capacity to the weight ratio of diethylaminoethyl methacrylate (DEAEMA) to wool.

FIG. 3 is a graph relating the BSA capacity to the effect of solvent extraction on a modified wool substrate.

FIG. 4 is a graph relating the BSA capacity of a DEAEMA-modified wool at various pH buffer.

FIG. 5 is a graph comparing the BSA binding capacity of DEAEMA-GA modified wool and DEAEMA-GMA modified wool.

FIG. 6 is a graph demonstrating the BSA binding capacity of DMAEMA-GA modified wool at various pH conditions.

BRIEF DESCRIPTION OF THE PREFERRED EMBODIMENTS

The support materials are based on a composite of an organic synthetic polymer and an insoluble polypeptide. In its most used embodiment the composite per se is biologically inert. The organic synthetic polymer carries chemical groups which are capable of coupling to the polypeptide, and also carries chemical groups which can provide ion exchange capacity, which can be converted to provide ion exchange capacity, which can provide anchoring capacity for affinity ligands or for biologically active molecules in general, or which can provide hydrophobic groups.

Strictly speaking, the polymer coupled to the polypeptide may be either a copolymer or a homopolymer. When the chemical groups capable of coupling to the polypeptide are the same as the chemical groups useful as anchoring units for affinity ligands or biologically active molecules, the polymer, in this particular form would be a homopolymer. In the more general form, however, the polymer is a copolymer containing groups capable of coupling to the polypeptide and also different groups capable of serving as retaining or anchoring groups for molecules.

The invention also relates to ion exchange materials obtained from the modified polypeptide which are obtained by further reaction with crosslinking agents, and/or by further reactions such as chemical ionization, or unmasking of potentially masked ion exchange groups.

The invention also relates to materials derived from the modified polypeptide by attaching thereto affinity ligands or biomolecules, to thereby obtain affinity chromatography or bioreactive materials or attaching thereto hydrophobic substituents for reverse phase chromatography.

The invention also relates to mixtures of the aforementioned materials with unmodified polypeptides, with modified or unmodified particulate material, or mixtures thereof to give a variety of separation media.

MATERIALS

The term polypeptide as used in the specification and claims is meant to include compounds made up of many—tens, hundreds or even thousands—of amino acids linked through amide linkages (CONH) with elimination of water. A segment of such a chain is as follows:

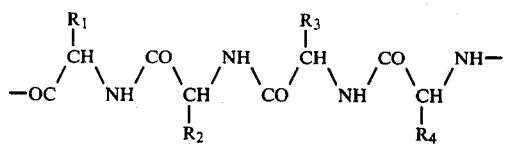

wherein $R_1$, $R_2$, $R_3$ and $R_4$ are typical amino acid residues.

The sequence of amino acids in the chain is of critical importance in the biological functioning of the polypeptide, and the chains may be relatively straight, or they may be coiled or helical. In the case of certain types of polypeptides, such as keratins, they are cross-linked by the disulphide bonds of cysteine. The polypeptide, however, may be biologically inert, such as a homopolyamino acid chain.

Proteins are coiled and folded into very complex special patterns and may be roughly classified into two groups on the basis of the extent of their coiling and folding. Those arranged as long linear molecules are called fibrous proteins. These fibrous proteins are relatively insoluble in water, salt solutions, and other aqueous media and make up important structural elements of the animal body. The fibrous proteins include collagen (the principal fibrous protein of skin, tendons, ligaments, cartilage, bone, the cornea or the eye, etc.), myosin (one of the chief proteins in muscle), keratin (the major protein in hair), and fibrin (a protein important in blood clotting).

Proteins more highly coiled and folded into a nearly spherical configuration are termed globular proteins. Globular proteins are soluble in aqueous media, such as salt solutions, acids, bases or aqueous alcohol.

The invention to which this application is directed includes essentially all forms of insoluble polypeptides. However, the preferred polypeptides are the fibrous polypeptides. Among the fibrous polypeptides, keratin is the most perferred polypeptide for the purposes of this invention. Of the keratinous polypeptides, animal fiber such as wool and other types of epidermal hair are most preferred.

The term "wool" is applied to the fibers from the fleece of the sheep and as such falls into the category of epidermal hair. The fiber structure is made of several layers of different types of keratin cells. There is an outer layer with three subdivisions, the cortex with its cortical cells, and the medulla or core. The outer layer, containing overlapping scales, gives wool its remarkable fibrous surface appearance. This scaly outer layer is composed of keratin, whereas keratin C contains tyrosine and exists mostly in the interior of the fiber. The polypeptides comprising wool fiber are long peptide chains which are bridged by cysteine and salt linkage, the chemical structure of wool can generally be presented as follows:

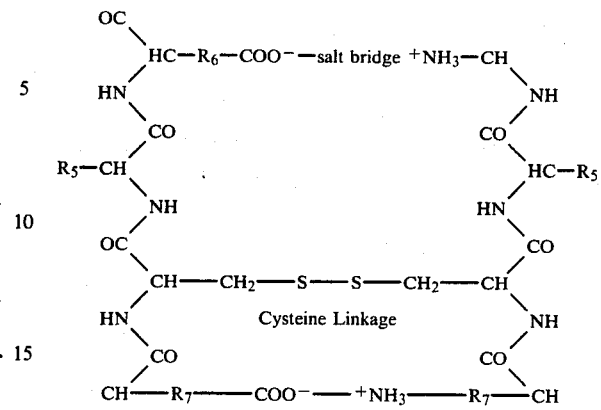

where $R_5$ equals groups linking other chains, $R_6$ equals alkyl, amino or side chain groups such as found in proline and tyrosine, and $R_7$ equals short chain linkage groups.

The chemical structure of wool plays an important role in the physical behaviour of the fiber. The salt linkages which are governed by Van Der Waals forces can be easily broken. However, because the side chains of the main polypeptide chain are so bulky, there is not close packing (as in cellulose chains) and they tend to fold into coils. These coils may be stretched out at the expense of the side chain bonds, these side chain bonds breaking as the chains slip past each other, thereby preserving fairly secure chemical stability. This characteristic permits wool to have great extensibility and flexibility. At the same time, new bonds may be formed with one molecular form of keratin changing to another, thereby retaining the basic strength of the fiber.

The final structure of the molecular support of the present invention comprises a polypeptide chain covalently modified at a multiplicity of sites along the chain, these sites modified with a synthetic polymer or polymers.

The polymer which modifies the polypeptide may be a homopolymer or a copolymer, with copolymers being preferred. However, polymers wherein polymerizable compounds (a) and (b) are the same are within the scope of the present invention. The definition of the polymer as a homo- or copolymer depends on whether the polymerizable compound making up the polymer is the same or different. In its most general form, the copolymer may be a random, a block, or an alternating copolymer.

A particular polymer utilized to modify the polypeptide substrate is a polymer comprising (a) a polymerizable compound which has a chemical group capable of direct or indirect covalent coupling to the polypeptide chain and (b) one or more polymerizable compounds containing (i) an ionizable chemical group, (ii) a chemical group capable of transformation to an ionizable chemical group, (iii) a chemical group capable of causing the covalent coupling of the polymer to an affinity ligand or a biologically active molecule, or (iv) a hydrophobic chemical group. For purposes of this discussion, the chemical group capable of covalent bonding with the polypeptide chain will be referred to as the "coupling group" while the chemical group of comonomer (b), above, which is capable of retaining or immobilizing bioactive molecules will be referred to "the functional group."

Monomer (a), above, typically contains vinyl unsaturation to promote polymerization and/or copolymerization with other monomers and, at the same time, contains a group capable of covalently bonding to the polypeptide chain through the amino groups of the polypeptide chain. Typical groups for covalently bonding to the polypeptide chain through its amino groups include glycidyl groups, anhydride groups and N-methylol groups. Among the compounds containing a glycidyl group are the ethers or esters formed between a glycidyl alcohol and an unsaturated alcohol or unsaturated carboxylic acid. Typical glycidyl alcohols are aliphatic and cyclo-aliphatic alcohols and ether alcohols having from 3 to 18 carbon atoms which are esterified with an alpha, beta-unsaturated carboxylic acid, preferably acrylic or methacrylic acid, or are etherified with olefinically or acetylenically unsaturated alcohol. Typical compounds are glycidyl acrylate and methacrylate; 4-5-epoxy-pentyl acrylate; 4-(2,3-epoxy propyl)-N-butyl methacrylate; 9,10-epoxystearyl acrylate; 4-(2,3-epoxy propyl)-cyclohexyl methacrylate; ethylene glycol-monoglycidylether acrylate, and allyl glycidyl ether.

Typical N-methylol group-containing compounds include N-acrylamide and acrylate-containing amino groups. Typical anhydride group-containing compounds include maleic anhydrides and derivatives thereof.

The polymerizable comonomer (b) will vary depending on the ultimate use of the carrier material. If the carrier material's ultimate use is to serve as an ion exchange chromatographic material, the comonomer (b) may contain any of the well known ionizable chemical groups or precursors thereof such as compounds containing a vinyl or vinylidine group and a carboxylic acid, a carboxylate salt, a carboxylate ester (preferably having 1 to 6 carbon atoms), a carboxylic acid amide, a secondary or a tertiary amine, a quaternary ammonium, a sulfonic acid, a sulfonic acid ester, a sulfonamide, a phosphoric or phosphonic acid, or a phosphoramide or phosphonamide group.

When comonomer (b) carries the precursor of a material having ion exchange properties, the ion exchangable group itself can be obtained by unmasking, such as for example, by selective hydrolysis of an anhydride, ester or amide, or salt formation with an appropriate mono-, di- or trivalent alkaline or alkaline earth metal, as is otherwise well known in the art.

Preferred ion exchange functionalities for comonomer (b) are aminoethyl, carboxymethyl, carboxyethyl, citrate, dimethylamino, diethylaminoethyl, ecteola (mixed amines), guanido ethyl, phosphonic acid, p-aminobenzyl, polyethylene imine, sulphoethyl, sulphomethyl, triethylaminoethyl, or chelating groups such as $-N(CH_2CO_2H)_2$.

When the ultimate use of the carrier material is as a support for an affinity ligand, comonomer (b) carries a chemical group capable of causing the covalent coupling of said comonomer (b) to an affinity ligand, i.e. an "anchoring" group. Since most affinity ligands carry nucleophiles such as hydroxy, amino, thiol, carboxylate, and the like, any electrophilic group capable of reacting with such nucleophile can be present in comonomer (b). Such electrophilic groups include, but are not limited to, activated carboxy groups used in peptide chemistry for the formation of peptide bonds, such as carbonyl chlorides, carboxylic anhydrides and carboxylic acid azide groups, as well as phenyl esters and aldehydes used for the formation of Schiff (imine) bases.

Also useful are the carboxylates of hydroxylamino or other derivatives of the formula (1)

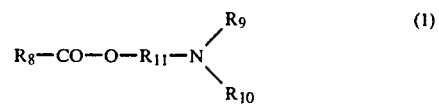

in which $R_8$ is an alpha, beta-unsaturated, polymerizable radical and $R_9$ and $R_{10}$ are identical or different $C_1-C_6$ alkyl or alkanoyl groups. $R_{11}$ may be a direct bond (—) or a $C_2-C_3$ alkyl group. $R_9$ and $R_{10}$ together with the N atom may also form a heterocyclic ring. Typical compounds of this type are:

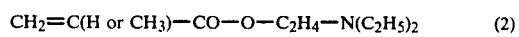

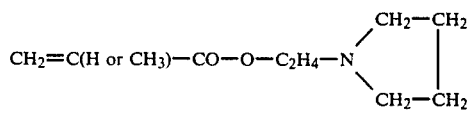

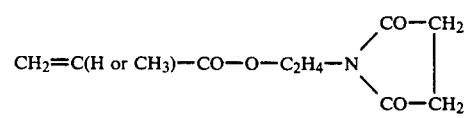

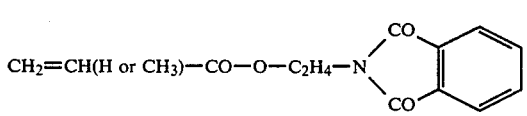

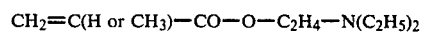

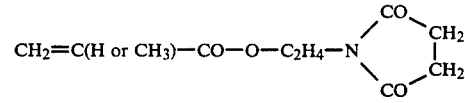

Further compounds within the scope of the present invention are those compounds having the formula (3):

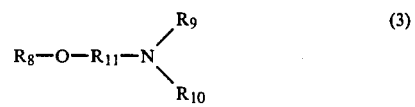

where $R_8$, $R_9$, $R_{10}$ and $R_{11}$ are as described above.

Other compounds having activated carboxyl groups include acryloyl- and methacryloyl chloride, acrylic and methacrylic anhydride, maleic anhydride, phenyl acrylate and methacrylate, glycidyl acrylate and methacrylate, 4-iodobutylacrylate and methacrylate, and 2-isopropenyl-4, 4-dimethyloxazolone-5. The last mentioned compound is capable of reacting with the terminal amino group of proteins.

A very useful potentially electrophilic reactive group in comonomer (b) useful for coupling to an affinity ligand is a group capable of being activated to an electrophilic group with a reagent such as a cyanogen halide. It is known in the art that cyanogen halides react with 1,2-diols to yield activated structures of the following type:

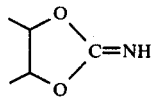

This structure is then capable of reacting with the nucleophile of an affinity ligand. Among the preferred 1,2-diols present in comonomer (b) are various saccharides, including monosaccharides such as glucose, mannose and galactose, disaccharides such as lactose and maltose, trisaccharides such as raffinose or, generally, glycosides. The 1,2-diol-containing functional group can be attached to the polymerizable comonomer (b) by such reactions as esterification, amide formation, esterification and the like. Among the most preferred of these is the reaction of glycidyl acrylate or methacrylate with a saccharide, to yield an ether-containing comonomer (b).

When the ultimate use of the carrier material is as a carrier for biological molecules, any of the anchoring groups mentioned for comonomers (a) or (b) can also be used. Other types of activated groups such as those containing aldehydes or amines can also be used.

The polymerizable comonomer (b) can be substantially of one type or can be a mixture of one or more types. This is particularly applicable when the ultimate use of the material is as an ion exchange carrier. Comonomers (b) can then contain such functional groups as anionic exchange groups and cationic exchange groups in various different ratios, if desired.

Preferably, the polymerizable monounsaturated compounds (b) are polymerizable compounds of the formula (4):

wherein
$R_{12}$ is hydrogen or methyl;
A is CO, O, or $SO_2$;
X is OH, OM (where M is a metal ion), $OR_{13}$ (where $R_{13}$ is a straight or branched chain $C_1-C_{18}$ alkyl group), $OR_{14}OH$ (where $R_{14}$ is a straight or branched chain $C_2-C_6$, alkyl or aromatic group), $NR_{15}R_{16}$ or $NR_{15}R_{16}R_{17}$ (where $R_{15}$ is the same or different as $R_{16}$ which is the same or different as $R_{17}$, and are hydrogen, $R_{13}$ or $R_{14}OH$);
AX may also have formula (5):

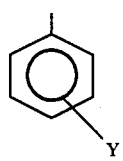

wherein
Y is $-CO_2^-$, $-CH_2CO_2^-$, $-SO_3^-$, $-CH_2SO_3^-$, $-PO_4H^-$, $-CH_2PO_4H^-$, $-CH_2N(CH_2COO^-)_2$, $-CH_2-NR_{15}R_{16}$, or $-CH_2-NR_{15}R_{16}R_{17}$, or the corresponding free acid, ester or partial ester groups, as described previously. In these formulae, the groups $R_{15}$, $R_{16}$; $R_{15}$, $R_{17}$; or $R_{16}$, $R_{17}$ may form a 5-7 membered heterocyclic ring with the nitrogen atom. $R_{15}$, $R_{16}$ and $R_{17}$ are as previously defined.

Alternatively, (and when the material is to be used as an anchor for affinity ligands or biomolecules), A is CO or $SO_2$, and X is most preferably $O-CH_2-CH(OH)-CH_2$-saccharide, where "-saccharide" is a mono-, di- or polysaccharide having a group which can be activated for reaction with nucleophilic reactive groups on the affinity ligand or the biomolecule by a cyanogen halide.

The preferred comonomer (a) for anionic exchange materials is glycidyl acrylate or methacrylate. The preferred comonomer (b) for anion exchange materials is dimethylaminoethyl acrylate (DMAEA) or methacrylate (DMAEMA). The preferred anion exchange material is the polymer formed from the reaction of glycidyl acrylate (GA) and dimethylaminoethyl methacrylate (DMAEMA).

The preferred comonomer (b) for cationic exchange materials is methacrylic acid, acrylic acid, acrylic acid dimer, or glycidyl methacrylate further oxidized to a sulphonic, phosphonic or carboxylic acid group after copolymerization. The preferred polymer for cationic exchange materials is polymerized glycidyl acrylate oxidized with $Na_2S_2O_3$ to carry sulphonyl groups.

The most preferred comonomer (b) for anchoring materials is the comonomer obtained from reaction of glycidyl acrylate or methacrylate with glucose.

The average molecular weight of the polypeptide-modifying polymer is dependent on the number of monomers present therein. It is required to have at least a sufficient number of comonomers (a) so as to be able to form covalent attachment throughout the polypeptide surface. The number of comonomers (b) cannot be too small, since otherwise the exchange capacity, or the anchoring/interacting capacity is negligible. The number of comonomers (b) can neither be too high, since this would cause great difficulty in the reaction between the reactive groups of comonomer (a) and the polypeptide. Preferably, the polypeptide-modifying copolymer carries anywhere between 1 and 500 units (a) plus (b), most preferably between 20 and 100 units. This corresponds to molecular weights of between about 1,000 and 1,000,000, preferably between 5,000 and 20,000.

Other neutral comonomers (c), different than those represented by (i), (ii), (iii) or (iv) supra, can also be added to the polymer, if desired. These comonomers may be polymerizable unsaturated compounds carrying neutral chemical groups such as hydroxy groups, amide groups, alkyl groups, aryl groups and the like. Preferred among comonomers (c) are $C_1-C_6$ alkyl acrylates or methacrylates, or the corresponding hydroxy alkyl acrylates or alkacrylates. The function of comonomers (c) may be to increase the presence of hydrophobic or hydrophilic residues in the polymers, so as to provide a desired balance of hydrophilic and hydrophobic groups, if necessary.

The minimum ratio of comonomer (a) to total comonomer content is important. The synthetic polymer should have a sufficient amount of comonomer (a) to permit substantial covalent coupling of the polymer to the polypeptide. If too little comonomer (a) is present in the polymer, then grafting becomes difficult, if not impossible. Generally, about 4-20, preferably 5-10% by weight of comonomer (a) relative to the total of (a) plus (b) (and (c) if any is present) is needed. Amounts of about 0.5 to 1 or 2% by weight appear merely to crosslink the polymer, without substantial grafting onto the polypeptide.

The upper limit of comonomer (a) in the polymer can be varied up to 99.9% by weight, depending on the desired amount of rigidity, functionality and hydrophilicity. Increasing the amount of comonomer (a) too much above 15 to 20% by weight, however, decreases the porosity. Large molecules then have difficulty in gaining full access to the functional groups in comonomer (b). It is preferred to have a predominance of comonomers (b) over comonomers (a). Comonomers (c) may be present in an amount of up to 20% by wieght of the total (a) plus (b) plus (c).

The weight ratio of polypeptide to the modifying polymer is freely adjustable, and varies from 0.1 to 3 weight parts of polymer to parts by weight of the polypeptide. The preferred weight ratio of polypeptide to modifiying polymer is in the range of about 0.5 to 3, with about 1 to 2.5 most preferred.

When comonomers (b) carry ionizable chemical groups capable of providing cation exchange capacity, it is found that unless some degree of crosslinking is provided, the flexibility of the material in solution tends to favor the formation of micelle-type aggregates and slow loss of capacity. Therefore, it is a preferred mode of the invention to provide polymeric crosslinking for these types of modified polypeptides. Crosslinking can be provided either by incorporating into the polymerization recipe a small amount of polyunsaturated comonomer having at least two polymerizable alpha, beta-carbon double bonds, such as for example mono- and polyethylene glycol dimethacrylates and diacrylates (with the polyethylene glycol residue containing up to 6 ethylene groups), ethylene dimethacrylate, ethylene diacrylate, tetramethylene dimethacrylate, tetraethylene diacrylate, divinylbenzene, triallyl cyanurate, methylene-bis-acrylamide or -bis-methacrylamide, and the like.

Another type of crosslinking agent is particularly applicable to copolymers made from an aminoalkyl comonomer (b). Because of the presence of a free pair of electrons on the aminoalkyl nitrogen atoms, crosslinking can be carried out with such bifunctional reagents as would react with nitrogen-free electron pairs. Among these are the diacyl halides, such as Hal-CO-$(CH_2)_n$-CO-Hal and Hal-CO-phenyl-CO-Hal, or the alkyl or aryl dihalides, such as Hal-$(CH_2)_n$-Hal and Hal-phenyl-Hal, wherein Hal is a halide such as chloride, bromide or iodide, and n may be anywhere between 2 and 12. Other bifunctional reagents capable of reaction with nitrogen atoms which can also be used include

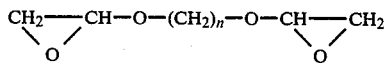

where n is 2 to 12. The advantage of these bifunctional reagents is that they simultaneously crosslink the copolymer, while also providing a cationic charge at the nitrogen centers, thereby ionizing the material.

The amount of crosslinking agent is best determined empirically. It is to be considered sufficient when the polymer preserves the ion exchange capacity at a constant value over time, yet would be too high if swelling is prevented, and too much rigidity is obtained in the final materials. Ideally, an amount of crosslinking agent between 1 to 20 mole percent of the synthetic polymer units is sufficient.

The term "affinity ligand," as used throughout the present application and in the claims, is meant to include any small or high molecular weight molecule which can be immobilized in a stationary phase and used to purify a complementary binding molecule from a solute phase by affinity chromatography. For example, a ligand can be an inhibitor, a cofactor, a prosthetic group, or a polymeric substrate, all of these useful to purify enzymes or holoenzymes. Other ligand/ligate pairs are enzyme/polymeric inhibitors; nucleic acid, single strand/nucleic acid, complementary strand; hapten or antigen/antibody; antibody/proteins or polysaccharides; monosaccharides or polysaccharides/lectins or receptors; lectins/glycoproteins or receptors; small target compounds/binding proteins; and binding protein/small target compounds. When antigen/antibody pairs are used as the ligand/ligate pair, the technique takes the particular name of "immunoaffinity" chromatography.

The "biologically active molecule" which can be anchored to the carriers of the invention can include enzymes, enzyme substrates, inhibitors, hormones, antibiotics, antibodies, antigens, peptides, saccharides, nucleic acids, and the like. The only requirement for these molecules is that they have reactive groups thereon which can be covalently coupled to the anchoring chemical groups on comonomer (b).

Of particular interest is the anchoring of enzymes such a hydrolases, isomerases, proteases, amylases, and the like. These immobilized enzymes can then be used in biochemical reactors, as is otherwise well known in the art.

The use of the term reverse phase chromatography or "hydrophobic interaction chromatography" is meant to include chromatography used to absorb hydrophobic components in mixtures. Such components include lipids, cell fragments and the like. In this embodiment, comonomer (b)(iv) is usually an acrylate or methacrylate ester of $C_6$–$C_{18}$ straight or branched chain alcohols, or of aromatic alcohols such as phenol or naphthol.

The carrier materials of the present invention can be used per se in the same manner as other carrier materials of the prior art. Alternatively, and in a preferred mode, the polypeptide material, which is preferably in fibrous form after the modification, can be formed into a self-supporting fibrous matrix, such as a fibrous sheet, with ion exchange properties, affinity chromatography properties, bioreactive or reverse phase properties. The modified fibrous polypeptide fibrous media can also incorporate unmodified fibers of various different sizes, and, in addition, can also incorporate modified or unmodified particulate material.

The fibrous media comprises a porous matrix of fiber wherein, because of the nature of the present invention, the fiber is effective for molecular or ionic separations or molecular reactions. The matrix is substantially homogeneous with respect to each component. When a particulate is present, it is prefered to modify it so that it is also effective for molecular or ionic separations or reactions. Such a particulate should be contained in the fibrous phase in an amount effective to achieve the desired separations or reactions. The overall media is substantially inert and dimensionally stable.

The preferred particulates which can be used include all of those substances which can be provided in finely divided form and exhibit chromatographic functionality, i.e., capable of effective molecular separations and/or reactions. Mixtures of such compositions may also be utilized. Exemplary of such particulates are silica, titania alumina, zirconium oxide, diatomaceous earth, perlite, clays such as vermiculite, carbon such as activated carbon, modified polymer particulates such as other ion exchange resins, crystalline cellulose, molecular sieves, and the like, the surfaces of which may be modified in a conventional manner. Such materials are commercially available under a variety of trademarks such as Biosila ®, Hi-Flosil ®, Li Chroprep Si ®, Micropak Si ®, Nucleosil ®, Partisil ®, Porasil ®, Spherosil ®, Zorbax cil ®, Corasil ®, Pallosil ®, Zipax ®, Bondapak ®, LiChrosorb ®, Hypersil ®, Zorbax ®, Perisorb ®, Fractosil ®, Corning Porous Glass ®, Dowex ®, Amberlite ® resins, and the like.

Examples of references which describe particulates effective for molecular separations are Miller, U.S. Pat. No. 3,669,841, Kirkland et al., U.S. Pat. No. 3,722,181, Kirkland et al., U.S. Pat. No. 3,795,313, Regnier, U.S. Pat. No. 3,983,299, Chang, U.S. Pat. No. 4,029,583, Stehl, U.S. Pat. No. 3,664,967, Krekeler, U.S. Pat. No. 4,053,565 and Iler, U.S. Pat. No. 4,105,426. The entire disclosures of all of these references are incorporated by reference.

The particle size of the particulate is not critical but influences somewhat the flow rate at which the sample to be treated passes through the material. Usually, uniform particle sizes greater than about 5 microns are preferred, with about 10-100 microns constituting a practical operational range. The amount of the particulate can vary widely from about 10 wt. % up to 80 wt. % or more of the solid phase. The optimum particulate concentration will vary depending on the molecular separation desired.

The fibrous media should be capable of immobilizing the particulate contained therein, i.e., capable of preventing significant particulate loss from the stationary phase, yet having a porosity which enables the fluid to pass through the media. Thus, although the modified polypeptides of the present invention are self-binding and the addition of extra fibers or binders may not be necessary, it is possible to utilize such extra fibers or binders. Other fibers usable for the media include polyacrylonitrile fibers, nylon fibers, wool fibers, rayon fibers and polyvinyl chloride fibers, cellulose fibers such as wood pulp and cotton, and cellulose acetate.

Another embodiment of the invention, which may also be coupled with the aforementioned polypeptides is an unrefined structural fiber which assists in providing sheets of sufficient structural integrity in both the wet "as formed" condition, and in the final dry condition, and also allows handling during processing as well as suitability for the intended end use. Such fibers are typically relatively large, with commerciality available diameters in the range of 6 to 60 micrometers. Wood pulp can also be used and has fiber diameters ranging from 15 to 25 micrometers, and fiber lengths of about 0.85 to about 6.5 mm. The unrefined self-bonding structural fibers typically have a Canadian Standard Freeness of +400 to +800 ml. Canadian Standard Freeness is described in full in U.S. Pat. No. 4,309,247, incorporated by reference herein. These long self-bonding fibers may constitute greated than 50% of the fibrous media, by weight, preferably 60-100% of the fibrous media, and most preferably 100%. Optionally, a minor portion of cellulose pulp which has been refined to a Canadian Standard Freeness of between +100 and −600 ml may be incorporated with a major portion of the normally dimensioned cellulose pulp (+400 to +800 ml). In particular, from about 1 to about 20% of the refined pulp and about 50% to about 90% of the unrefined cellulose may be contained in the matrix. Particulate may also be added.

When the particulate materials are millimicron-size, it may be desirable to use, in addition, a mixture of cationic and anionic resins as described by assignee's co-pending U.S. patent application Ser. No. 347,360, filed on Feb. 9, 1982. Alternatively, one may use a medium containing, in addition to the millimicron-size particles, a neutral organic polymeric resin having oxygen atoms along the polymeric backbone thereof, as described in the assignee's co-pending U.S. patent application Ser. No. 401,361, filed on July 23, 1982.

Also of particular interest in the present invention is the use of modified polypeptide fibrous media carrying modified inorganic support materials, such as for example are described in Regnier, U.S. Pat. No. 3,983,299, Kirkland et al., U.S. Pat. No. 3,795,313, Kirkland et al., 3,722,181, Mazarquil et al., U.S. Pat. No. 4,034,139, Talley et al., U.S. Pat. No. 4,118,316, Ho Chang et al., U.S. Pat. No. 4,029,583, Regnier, U.S. Pat. No. 4,108,603 and applicants' application Ser. No. 643,613, filed on the same date as this application. These are all incorporated herein by reference. In particular, it is possible to derivatize siliceous particles with silanes and attach thereto various ion exchange or anchoring groups. In this embodiment then, both the polypeptide fiber and the siliceous particulate are modified, and their interaction provides increased anchoring and/or ion exchange capacity. The addition of particulate material tends to increase the rigidity and strength of the fibrous media and renders it readily useful for industrial applications, especially those involving high pressure.

PROCESSES OF PREPARATION

Polymerization of comonomers can be carried out by radical chain, step-reaction, ionic and coordination polymerization. Particularly useful is radical polymerization.

The free radical addition polymerization of radical polymerizable comonomers is carried out with free radical initiators using the well known steps of initiation, addition and termination. A usual procedure is to utilize a substance or substances which produce radicals capable of reacting with the monomers. Probably the simplest of all polymerization initiators are the organic peroxides and azo compounds. These substances decompose spontaneously into free radicals in common organic solvents at a finite rate, at temperatures between 50° and 140° C. For example, benzoyl peroxide decomposes into two benzoyloxy radicals at 60° C. Another example is afforded by the azo compound azo-bisisobutyronitrile which similarly decomposes into radicals at easily accessible temperatures.

The necessary energy may also be provided by irradiating the initiator system with ultraviolet light. For example, initiation can be provided by irradiating the initiator system in the presence of photo initiators such as benzophenone and its derivatives, benzoin alkyl ethers or derivatives, or acetophenone, with ultraviolet light. It is necessary that the initiator molecules absorb in the spectral region supplied. In this way radicals can be generated at a finite rate at considerably lower temperatures than are necessary if purely thermal excitation is used. Finally, bimolecular reactions may produce radicals capable of initiating polymerization. Particularly important are the redox reactions, which occur in aqueous media, and involve electron transfer processes. For example, the systems Fe(II) plus hydrogen peroxide, or Ag(I), plus $S_2O_8^{--}$ are particularly important in initiating the radical polymerization of monomers. Because of the low temperature of initiation, the redox initiators or photochemically induced initiators are particularly preferred in the present invention. The amount of initiator is that sufficient to initiate the polymerization reaction. Polymerization is carried out until substantially all of the monomers or comonomers have been incorporated into the polymeric chains. This can be readily ascertained by simple analytical tests on the reaction mixture. Preferably, this polymerization is accomplished almost simultaneously with or immediately prior to the covalent coupling of the polymer to the polypeptides. Preferably, the coupling and polymerization are performed in the same aqueous phase.

In one embodiment, the codensation of the comonomer (a) with the polypeptide amino groups, whether carried out before polymerization or thereafter, is normally carried out by adjusting the temperature of the reaction mixture, or by adding an appropriate acid/base catalyst.

As mentioned above, copending application Ser. No. 576,448, filed Feb. 2, 1984, describes the grafting of acrylic copolymers on cellulosic substrates—among other methods—by free-radical polymerization. Mechanical agitation is sufficient in that case to thoroughly to disperse the monomers prior to polymerization. While it is possible to achieve some degree of covalent bonding of acrylic polymer to a wool substrate, the substantial incompatability between wool and the copolymer, however, does not provide for optimal productivity. Accordingly, it has been discovered that, in this case, the preferred method for performing the grafting of the acrylic polymer to the wool substrate involves the use of surfactants, the use of which will produce a wool-acrylic composite structure having enhanced weight gain and adsorption capacity. Preferred surfactents include the non-ionic surfactant materials, with cationic types providing less effective results and anionic surfactents being the least desirable surfactants.

Among the non-ionic surfactants, lauryl alcohol ethoxylate with 12 ethoxylate units (Siponic LAE-612 ®) is a preferred nonionic surfactant. Among the cationic surfactants, ethoxylated tertiary amine with 15 moles of ethylene oxide (Ethomeen C/25 ® by Armak) and ethoxylated amonimum chloride (Ethoquad ® by Armak) are preferred. Sodium lauryl sulfate (Sipex UB ® by Alcolac) is a typical anionic surfactant. The selection is not critical; any of the conventional surfactants within the scope of this invention may be used. The selection of specific suitable surfactants is a function of the particular monomers and substrates and determinable by routine experimentation. Typically, surfactant is employed in amounts of about 0.1 to 50% by weight, based on the weight of the polypeptide substrate.

The most preferred method of carrying out the process is in a "one-pot" system, using a hydroxy reactive comonomer (a). All desired comonomers and polypeptides are added to an inert solvent system, such as, e.g., water, alcohols, organics, and the like. The polypeptide and comonomers are treated under conditions which will initiate polymerization of the comonomers. This can be accomplished, for example, by adding to a well stirred mixture a water solution of an initiator such as ammonium persulfate and sodium thiosulfate, and initiating polymerization from about 15° C. to 40° C. Alternatively, a photolabile initiator can be added and initiation caused by photochemical means. After stirring for a time sufficient to allow the polymerization to proceed to completion, the linking of the formed copolymer to the amino groups of polypeptide is caused by increasing the temperature of the reaction mixture to a temperature sufficient to cause this condensation. In the case when the linking group on the copolymer is a glycidyl group, such temperature is normally around 80°–100° C. Reaction time is then allowed to proceed at the second temperature for a time sufficient to either go to completion, or to achieve modification of the polypetide to the desired capacity. The product is filtered, washed and dried for further treatment, if necessary. Unreacted monomer is preferably washed away with alcohol, unreacted catalyst with aqueous media and polymer with methanol or ethanol.

Further reaction of the modified polypetide may be by crosslinking, activation of the ion exchange potential, as for example by quaternization of nitrogen functions, saponification of esters, ionization of acids, sulfonation, phosphorylation or oxidation of epoxides, or other similar procedures. Quaternization, saponification, oxidation and salt formation are reactions well known to those skilled in the art, and will not be described in greater detail. Needless to say, the reactions useful for potentiation of the ion exchange potential of the material should not destroy the polypetide/copolymer linkages. Generally, strong acid conditions should be avoided.

Quarternization of aminoalkyl functions can be carried out simultaneously with crosslinking by reacting the modified polypetide with diacyl halides or alkyl dihalides, at a ratio of 0.1 to 30 parts by weight of the halides per 100 parts of polypetide at appropriate temperature, time and solvent conditions.

Another further reaction of the modified polypeptide materials would be to anchor the affinity ligands or biologically active molecules ot the anchoring groups of comonomer (b). This reaction can be readily accomplished by mixing in an appropriate solvent, normally aqueous, the affinity ligand or biomolecule to be anchored and the modified polypeptide, and carrying out anchoring for a time and under conditions sufficient to cause covalent coupling therebetween. It may be necessary to activate polypeptide groups on comonomer (b) with such materials as cyanogen halides, and then to treat further the activated polypeptides with the affinity ligands or biomolecules. In this embodiment, it is preferred to first prepare the polymer linker, covalently bind the polymer linker to the polypeptide and covalently bind the ligand to the modified polypeptide.

Typical ligands include human serum albumin, lysine, soy bean trypsin inhibitor and protein A. In general, any of the known ligands capable of being bound to the functional groups of the modified polypeptides are suitable for this aspect of the invention.

The reactions between the affinity ligand or biologically active molecule and the anchoring groups on comonomer (b) are normally carried out at temperatures of from 0° C. to 50° C., and may involve the addition of catalysts such as acid or base, or metals, or such other materials as DCC. The resulting ligand- or biomolecule-containing modified polysaccharide is washed under appropriate conditions and is ready for further treatment, if necessary.

Hydrophobic comonomers (b)(iv) are normally added to a copolymerization mixture in the presence of alcoholic solvents and/or surfactants. Washing is then carried out with alcohols.

An illustrative example of the formation of a product under this invention is a composite of (1) wool and (2) a copolymer of (a) glycidyl acrylate (GA) and (b) dimethylaminoethyl methacrylate (DMAEMA). This will be used only to show the many variables which are involved in the preparation, and which can be controlled to achieve a virtually unlimited number of products and resulting properties.

Step 1. Fiber Dispersion and Addition of Monomers

Wool fiber is dispersed in water at 1% solids content—DMAEMA and GA are added, along with surfactant.

Variables (A) Chemical nature and physical size of wool;
(B) Purity of monomer;
(C) Percent solid content;
(D) Monomer/wool ratio;
(E) DMAEMA/GA ratio;
(F) Nature and amount of surfactant Step 2. Polymer Formation Temperature of slurry is raised to 15° C. to 40° C., purged with nitrogen, followed by addition of catalyst and reaction for 1-2 minutes.

Variables (A) Temperature and reaction time;
(B) Amount of catalyst

Step 3. Coupling of Polymers to Wool

Temperature of slurry is raised to 60° C. to 100° C. within 25 minutes.

Variables (A) Rate of temperature rise;
(B) pH of slurry

Step 4. Wash (1)

Four volumes of water are used to wash the product in order to remove the inorganic catalyst left in the system.

Variables (A) Volume of water required to bring out the salt;
(B) Mode of washing Step 5. Wash (2)

Two volumes of solvent, typically water or methanol, are used to wash the product in order to remove the homopolymer and unreacted monomer.

Variable (A) Amounts of solvent, depending on reaction conditions

Step 6. Wash (3)

Where a solvent other than water is used in Step 5, four volumes of water are used to wash the product in order to remove the solvent entrapped in the fibers.

Variable (A) Amount of water

Step 7. Acidification

The product from Step 6 is redispersed in water and 1M HCl is added gradually to pH 4.0-4.5.

Variable (A) Amount of water

STEP 8-11: QUATERNIZATION

Step 8. Quaternization 1,6 dichlorohexane is added to the slurry of step 3 wherein the temperature is reduced to 50° C. in the presence of KI as catalyst. The temperature is raised to 95° C. and refluxed for 15 hours.

Variables (A) Quaternization agent;
(B) Solvent;
(C) Reaction time and temperature Step 9. Wash (5)

Water is used to remove the KI salt and the quaternization agent.

Step 10. Acidification

1M HCl is used to protonate remaining unquaternized DMAEMA.

Variable (A) Balanced DMAEMA and QAE depends on the degree of quaternization carried out in the system Step 11. Wash (8)

Excess acid is washed away.

Steps 8-11 are optional and used only when quaternization is desired.

The preferred formation of self-supporting fibrous media from the modified polypeptide materials of the invention can be carried out immediately after polymerization and polypeptide modification. In this mode, unmasking the ion exchange groups or anchoring of affinity ligands or biomolecules may be carried out on the formed sheets themselves. Alternatively, the fibrous media is formed after unmasking of the ion exchange groups and/or anchoring of affinity ligands or biomolecules. The preferred method is to form the fibrous sheets after polypeptide modification, and carry out further reactions, such as unmasking and anchoring on the sheets.

A self-supporting fibrous matrix using the modified polypeptide of the invention can preferably be made by vacuum filtering an aqueous slurry of fibers and, if desired, additional resins and modified or unmodified particulate. This forms a sheet having uniformly high porosity, fine pore-size structure with excellent flow characteristics and is substantially homogeneous with respect to fiber, resins and particulate.

The vacuum filtration is performed on a foraminous surface, normally a woven wire mesh which, in practice, may vary from 50 mesh to 200 mesh, with mesh openings ranging from 280 micrometers to 70 micrometers, respectively. Finer meshes are unsuitable because of clogging problems and/or structural inadequacy.

The sequence of adding the overall components to the slurry (modified fibers, other fibers, particulates, modified particulates, other resins, etc.) is relatively unimportant, provided that the slurry is subjected to controlled hydrodynamic shear forces during the mixing process. The slurry is normally prepared at, say, about 4% consistency and then diluted with additional water with a proper consistency required for vacuum filtering and sheet formation. This latter consistency will vary depending upon the type of equipment used to form the sheet. Typically, the slurry is cast onto a foraminous surface, vacuum filtered and dried in the conventional manner.

The flat, dimensionally stable sheet can be of any desired thickness and is then cut to the appropriate dimensions for each type of application. In one embodiment, for example as described in U.S. Pat. No. 4,384,957 to Crowder, III, et al., the wet sheet is dried and then cut to proper size in order to form discs. These discs are loaded into an appropriately sized cylinder to form a cylindrical column. The disc and cylinder should preferably be in interference fit so that the disc can be pushed into the cylinder without distortion, but not fall under gravitational force allowing gaps between the discs and the cylinder. After the column is packed dry, a pump can be used to pump solvent through the elements stacked in the column. Preferably, the elements swell to form a substantially tight edge seal to the cylinder wall. Because the individual elements are dimensionally stable, the column is not sensitive to orientation or handling, a problem which is common with other chromatographic media, particularly of any gel type media. Optionally, the media may be formed into a cylindrical configuration similar to that described in U.S. Pat. Nos. 2,539,767 and 2,539,768 to Anderson, herein incorporated by reference.

In another embodiment, the media may be cut into disc form and used in a manner similar to laboratory filtration.

In a preferred embodiment, the modified polypeptide media of the invention in fibrous form is shaped into a jelly-roll configuration, as disclosed in co-pending U.S. patent application Ser. No. 505,532 filed June 17, 1983 by Leeke et al., incorporated by reference herein.

The jelly roll configuration is normally shaped into a cartridge. Utilization of the cartridge has several advantages. Production scale flow rates of 200-500 ml/min can be utilized with the cartridge, depending on the application. They can be housed in special housings made of materials such as polysulphone or polycarbonate with acetyl end caps, where the cartridge can be autoclaved. The cartridges show long term stability with respect to their binding capacities at room temperature storage.

The rigidity of the matrix allows the column to be operable in unrestricted diameter for high volume processes. The column volume is virtually unaffected by changing pH or ionic strength in the buffer solution. Such a system can be equilibrated and regenerated in a short period of time, eliminating cumbersome procedures of column preparation and regeneration.

The column comprises a housing and at least one solid stationary phase within the housing. The stationary phase has chromatographic functionality and is effective for chromatographic separation. Means are provided for radially distributing the sample through the stationary phase and for collecting the sample after the sample has flowed through the stationary phase. The stationary phase comprises:

(a) a swellable fibrous matrix in sheet form having chromatographic functionality and being effective for chromatographic separation, spirally wound around the longitudinal axis of the solid stationary phase to form a plurality of layers around the axis; and (b) a spacer means between each layer for permitting controlled swelling thereof and enhancing the distribution of sample flowing radially through the stationary phase.

The solid stationary phase may be fabricated into a cartridge form for placement in the housing. A plurality of cartridges may be used either in series or parallel flow configuration in a single housing.

USES

The ion exchange, affinity, reverse phase, or bioactive materials of the invention can be used in any of the well known prior art processes of ion exchange, affinity or reverse-phase chromatography, or as supports for bio-reactors.

The materials obtained in the present invention have unique properties over materials used heretofore. A binary system formed by mixing modified polypeptide with other types of materials, such as microcrystalline cellulose, and forming a fibrous sheet (without the addition of extra particulate material) has the advantage of lacking silica materials, which normally shows nonspecific adsorption of proteins. A highly controllable degree of swelling which can be readily controlled by adjusting the multiple variables present in the system, allows the replacement of unmodified microcrystalline cellulose by other mechanical strengtheners, has low production cost, and high exchange capacity or anchoring capacity, which can, in any event, be modified by controlling the ratio of comonomers (a) and (b).

A ternary system formed from modified polypeptide, modified or unmodified particulate, and modified or unmodified fibers other than polypeptide has the advantage of potential maximization of swelling, rigidity and capacity obtainable through varying the multiple variables present in the system. Flow rates can be controlled by varying the ratio of organic to particulate (especially silica) components without significant loss of capacity. In addition, such a system shows advantages over prior art systems using nonmodified celluloses in that, in many instances, no refined pulp is necessary, since the polymer linked on the polypeptide will function as well as refined pulp in bridging particles to the fiber surfaces. The polymeric components in the present system may also function as binder resins; therefore, addition of resins to the slurry can, if desired, be eliminated.

The prior art has relied upon high surface area substrates to maximize the binding capacity of the ion exchange medium, the maximum number of functional sites limited by the surface area of the substrate. In contrast thereto, the present invention substantially increases the binding capacity by forming a polymer chain containing a multitude of functional sites along the chain, each polymer chain then bound to the substrate at a functional site. In this manner, the effective surface area of the medium is increased with a concomitant increase in binding capacity which far exceeds that obtainable by merely providing a higher surface area substrate or coating a substrate by in situ polymerization, the coating masking the functionality of the underlying substrate. The present invention results in an ion exchange medium with excellent swellability while still maintaining the rigidity and structure required for good exchange. Further, by crosslinking the polymer chains, the flexibility of the ion exchange matrix, and hence the effective pore size of the matrix, can be varied to suit individual needs. Where larger molecules are involved, a less highly crosslinked matrix having increased flexibility and resilience is produced. This increased flexibility and resilience permits larger molecules to be entrained in the interior of the matrix, thereby maximizing its utility. Where smaller molecules are involved, a more highly crosslinked matrix having greater rigidity may be produced. Thus, as long as the functional groups along the polymer chain are made accessible for ion exchange or anchoring, the preparation is no longer limited by the surface area of the substrate.

In protein separations and purifications, the key factor which ought to be avoided is possible damage to the protein molecules. In the present invention, this is avoided by using biocompatible materials such as polypeptides with only limited amounts of organic polymers. The materials are swellable and provide for very little denaturation of protein. Nonspecific adsorption of biopolymers is decreased, since both acrylic and polypeptide show very low amounts thereof, and are hydrophilic in nature. The chromatographic separation media of the present invention find particular utility in blood filtration techniques, as well as with regard to purification of various blood fractions.

Another area of design flexibility and design control is in the possible adjustment of the length of the acrylic polymer carrying the various ion exchange or anchoring groups. The variability of the polymer length not only may eliminate steric hindrance due to solute or ligand accessibility, but also minimizes leakage of the ligand from the matrix. The polymer "arm" should not be too long to avoid potential internal hydrophilic interaction, such as folding back. An "arm" of about 5 to 20 atoms is generally ideal for attaching the bioligands.

By the use of well known anchoring groups for affinity ligands or biomolecules, the materials can incorporate all of the synthetic methods developed in prior art commercial materials, such as Sephadex ® or Sepharose ®.

Finally, the matrix is chemically and physically stable with minimum change of dimensional stability upon contact with salt and eluents.

EXAMPLES

Having now generally described this invention, the same will be better understood by reference to certain specific examples which are included herein for purposes of illustration only, and are not intended to be otherwise limiting.

EXAMPLE 1

Five grams of grade 64S wool having a fiber length of 1.5 inch and a diameter of about 20 microns was fiberized for one hour. The fiberized wool was then dispersed in 200 ml. of $H_2O$ in a 500 ml three-necked round bottom reactor containing 2.25 grams of lauryl alcohol ethoxylate (LAE) containing 12 ethoxylate units, the product commercially available under the trade name Siponic LAE-612. 12.5 grams of diethylaminoethyl methacrylate (DEAEMA) and 1.3 grams of glycidyl methacrylate (GMA) were thoroughly mixed and introduced into the reactor with agitation. 1.0 g of ammonium persulfate (APS) and 1.0 g of sodium thiosulfate (STS) were added to the reactor as aqueous solution sequentially, at room temperature. At room temperature, the GMA and DEAEMA polymerize. The temperature was rapidly increased to 80° C. and maintained with rapid agitation, whereupon grafting of the polymer to the wool occurred. After one hour, the reaction was permitted to cool to room temperature and the product filtered, washed with deionized water, washed with aqueous HCl at pH 3.5 and washed again with deionized water. The final produce yield was 15.7 grams of polymer-modified wool substrate. See FIG. 1.

EXAMPLE 2

Example 1 was repeated with the exception that 1.5 grams of LAE surfactant were employed. The final product yield was 13.7 grams. See FIG. 1.

EXAMPLE 3

Example 1 was repeated with the exception that 1.0 gram of LAE surfactant was employed. The final product yield was 10.5 grams of polymer-modified wool. See FIG. 1.

As may be seen from FIG. 1, the amount of polymer bound to the substrate varies directly with the amount of surfactant. At two grams of surfactant, the final yield of product triples the weight of the wool substrate. However, the product which is ⅔ polymer and ⅓ wool is less rigid and more gel-like in character. A compromise between structural integrity and binding capacity is required, with optimum properties resulting in a formulation that is 50% polymer and 50% substrate.

EXAMPLE 4

The binding capacity of the modified wool substrates for bovine serum albumin (BSA) was evaluated by dissolving 20 mg/ml of BSA in 0.01M phosphate buffer at pH 6.3. After one hour of agitation of the media with the BSA solution, the supernatant sample solution and control solution evaluated at 280 nm using a Varian Cary 210 spectrophotometer. BSA capacity was evaluated using the following equation:

$$BSA \text{ Capacity (mg/g)} = \frac{A_1 - A_2}{0.66} \times 100$$

where
$A_1 = A_{280}$ reading of the control solution
$A_2 = A_{280}$ reading of the supernatant solution.

A modified wool substrate prepared according to Examples 1–3 was prepared, the weight ratio of DEAEMA monomer to wool being 0.63. The product had a BSA capacity of 1250 mg/g. See FIG. 2.

EXAMPLE 5

Example 4 was repeated with the exception that a product having a DEAEMA monomer/wool weight ratio of 1.25 was evaluated. The BSA binding capacity was 1462 mg/g. See FIG. 2.

EXAMPLE 6

Example 4 was repeated with the exception that a product having a DEAEMA monomer/wool weight ratio of 2.00 was evaluated. The BSA binding capacity was 1766 mg/g. See FIG. 2.

EXAMPLE 7

Example 4 was repeated with the exception that a product having a DEAEMA monomer/wool weight ratio of 2.5 was evaluated. The BSA binding capacity was 2273 mg/g. See FIG. 2.

Thus, as may be seen from Examples 4–7, the effect of DEAEMA is to increase the BSA absorption capacity as the weight ratio increases. The limiting factor again is that imposed by the structural requirements of the matrix.

EXAMPLE 8

In order to evaluate whether true grating of the polymer chain to the wool substrate was achieved, the stability of the graft-substrate was evaluated with regard to its BSA binding capacity after agitation in 50% ethanol for varying periods of time. A wool-copolymer substrate according to Examples 1–4 was prepared, the modified wool initially demonstrating BSA capacity of about 1840 mg/g. After four hours immersion in the 50% ethanol solution, the modified wool still had a BSA capacity of 1800 mg/g. See FIG. 3.

EXAMPLE 9

Example 8 was repeated using 100% ethanol. The resulting modified wool retained almost 100% of its original binding capacity. See FIG. 3.

EXAMPLE 10

The effect of pH on the binding capacity of DEAEMA-GMA modified wool media prepared in accordance with the present invention was evaluated. At pH 6.3 in phosphate buffer, the modified wool had a BSA capacity of about 1775 mg/g. See FIG. 4.

EXAMPLE 11

The same modified wool as in Example 10 was evaluated in phosphate buffer at pH 6.7–6.8 and found to have a BSA capacity of almost 2000 mg/g. See FIG. 4.

EXAMPLE 12

The same modified wool as in Example 10 was evaluated in phosphate buffer at pH 7.2–7.3 and found to have a BSA capacity of less than 1700 mg/g. See FIG. 4.

EXAMPLE 13

At pH 8.0, the BSA capacity is about 450 mg/g.

EXAMPLE 14

The BSA binding capacity of a wool modified with a diethylaminoethyl acrylate (DEAEA)-glycidyl acrylate (GA) copolymer is compared with that of the DEAEMA-GMA copolymer at various pH in phosphate buffer. To prepare the modified wool, the procedures according to Example 1 is followed with the exception that 15 ml of DEAEA monomer, 0.76 ml of GA monomer, 0.5 g APS and 0.5 g STS are employed, in 250 ml $H_2O$. The DEAEMA-GMA modified wool and DEAEA-GA modified wool are evaluated for BSA capacity according to the method of Example 4 over a pH range of 6.0 to 9.0, with the results being shown in FIG. 5. As may be seen from FIG. 5, the capacity of the DEAEA-GA modified wool at higher pH's exceeds that of the less hydrophillic DEAEMA-GMA modified wool.

EXAMPLE 15

Wool modified with dimethylaminoethyl methacrylate (DMAEMA)-glycidyl acrylate (GA) copolymer is prepared in a manner similar to Example 1. 5 grams of grade 64S wool having a fiber length of 1.5 inch and a diameter of about 20 microns is fiberized for one hour. The fiberized wool is then dispersed in 250 ml of $H_2O$ in a 500 ml three-necked round bottom reactor containing 2.25 grams of Siponic® LAE-612. 12.5 g of DMAEMA and 1.25 g of GA are thoroughly mixed. The temperature of the wool-water-surfactant mixture is increased to 90° C. and the monomer mixture added to the reactor. 0.5 g of APS and 0.5 g of STS are dissolved in water and poured into the reactor, with strong agitation. Temperature is maintained in the range of 89°–92° C. with rapid agitation. After one hour the reaction is permitted to cool to room temperature and the product filtered, washed with deionized water, washed with aqueous HCl at pH 3.5 and washed again with deionized water. The BSA capacity of this product, designated DM, is evaluated at various pH conditions, the results reported at FIG. 6.

EXAMPLE 16

The DMAEMA-GA-modified wool of Example 15 is prepared as in Example 15. However, after one hour of agitation at 89°–92° C., the reaction mixture is cooled to 60° C. and an aqueous solution of EtI and KI are added to the reaction mixture. The quaternization proceeds for 15 minutes at 60° C. under $N_2$ atmosphere. The reaction product is cooled to room temperature, washed well with water, and acidified to pH 3.3. The BSA capacity of this product, designated DM-Q, is evaluated at various pH conditions, the results reported at FIG. 6.

EXAMPLE 17

A DEAEMA-GMA-modified wool is prepared essentially according to Example 1. Following agitation for one hour at 80° C., the reaction mixture is cooled to 60° C. and quaternized by the addition of ethyl iodide-potassium iodide quaternizing reagent. The quaternization proceeds for 15 minutes at 60° C. under nitrogen atmosphere. At completion, the reaction is permitted to cool to room temperature, washed with water, and acidified to pH 3.3. The BSA capacity of this product, designated DE-Q, is evaluated at various pH conditions, the results reported at FIG. 6.

As may be seen from FIG. 7, the quaternized modified wool media provide better BSA binding capacity at the higher pH ranges, with the quaternized DMAEMA-GA product providing highest BSA binding.

EXAMPLE 18

Ion exchange media carrying sulfonyl ($-SO_3^-$) groups are prepared as follows. 5.0 grams of grade 64S wool having a fiber length of 1.5 inch and a diameter of about 20 microns is fiberized for one hour. The fiberized wool and 12.5 ml of GA monomer are added to a reactor containing 0.1 g LAE and 230 ml deionized water. The mixture is stirred vigorously while flushing the system with nitrogen gas until all components disperse completely. 0.5 g of APS dissolved in 10 ml of deionized water is added to the reactor, followed by 0.5 g of STS in 10 ml deionized water. Under agitation, the temperature of the reaction mixture is rapidly increased to 80° C. The grafting reaction is allowed to proceed at this temperature for 30 minutes. 12.5 ml of 2M HCl is added to the reactor with thorough mixing. 15 g Na$_2$SO$_3$ are added to the reactor, the reaction mixture temperature increased to 80° C., and the reaction continued at 80° C. with full agitation for one hour. After completion, the reaction mixture is poured into one liter of deionized water, the pH is adjusted to 3.5, and the final product is removed by filtration. This product is washed with one liter of deionized water five times, with the pH of the final wash adjusted to about 5.0. The bovine gamma-globulin capacity (mg/g) of this media was evaluated over a range of pH conditions. At pH 3.0, the bovine gamma-globulin capacity is in the range of 500–600; at pH 4.0, the bovine gamma-globulin capacity is in the range of 650–750; at pH 5.0, the bovine gamma-globulin capacity is in the range of 1200–1500.

Having now fully described this invention it will be understood that the same can be operated within a broad and equivalent range of structures, products, processes, and uses without effecting the spirit or scope of the invention or any embodiment thereof.

What is claimed is:

1. A process for effecting chromatographic separation of at least two components of a sample comprising contacting said sample with a self-supporting fibrous matrix comprising a modified polypeptide material, said modified polypeptide material comprising:
   (1) a water insoluble polypeptide covalently bonded to a synthetic polymer;
   (2) said synthetic polymer comprising a copolymer made from a free-radical polymerization of
      (a) a polymerizable compound containing an epoxy group capable of direct covalent coupling to an amino group of said polypeptide and a vinyl group, capable of free-radical polymerization; and
      (b) a polymerizable compound having the formula

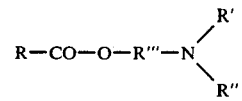

wherein R is an alpha, beta-ethylenically unsaturated polymerizable radical, R' and R'' are the same or different C$_1$–C$_6$ alkyl or alkanoyl groups, and R''' is a direct bond or a C$_2$–C$_3$ alkyl group, wherein R' and R'', taken together with the N atom may form a heterocyclic ring.

2. The method of claim 1, wherein said polymerizable compound (a) is selected from the group consisting of glycidyl acrylate and glycidyl methacrylate.

3. The method of claim 2, wherein said polymerizable compound (a) has been reacted with Na$_2$SO$_3$ or methacrylic acid.

4. The method of claim 1, wherein said polymerizable compound (a) is selected from the group consisting of glycidyl acrylate and glycidyl methacrylate and said polymerizable compound (b) is selected from diethylaminoethyl methacrylate and diethylaminoethyl acrylate.

5. The method of claim 4, wherein said synthetic polymer is a copolymer of glycidyl methacrylate and diethylaminoethyl methacrylate.

* * * * *